US012246424B1

(12) United States Patent
Lin

(10) Patent No.: US 12,246,424 B1

(45) Date of Patent: Mar. 11, 2025

(54) ELECTRIC NAIL GUN AND OPERATING METHOD THEREOF

(71) Applicant: Wang-Kuan Lin, Taichung (TW)

(72) Inventor: Wang-Kuan Lin, Taichung (TW)

(73) Assignees: WEAITH ENTERPRISE CO., LTD.; T-SET CO., LTD

(*) Notice: Subject to any disclaimer, the term of this patent is extended or adjusted under 35 U.S.C. 154(b) by 14 days.

(21) Appl. No.: 18/507,104

(22) Filed: Nov. 13, 2023

(51) Int. Cl.
*B25C 1/06* (2006.01)
*B25C 1/00* (2006.01)

(52) U.S. Cl.
CPC ................ *B25C 1/06* (2013.01); *B25C 1/008* (2013.01)

(58) Field of Classification Search
CPC .. B25C 1/008; B25C 1/06; B25C 1/08; B25C 1/143; B25C 1/00
See application file for complete search history.

(56) References Cited

U.S. PATENT DOCUMENTS

2012/0104069 A1* 5/2012 Chien ..................... B25C 1/008 227/2
2016/0144497 A1* 5/2016 Boehm ................... B25C 1/143 29/432

* cited by examiner

*Primary Examiner* — Veronica Martin

(57) ABSTRACT

An electric nail gun includes a main body, a limiting mechanism, an active mechanism, a passive mechanism, a magnetic attraction mechanism, a striking nail mechanism, a safety mechanism and a lithium battery case. The present invention allows users to activate a motor switch of the active mechanism while holding the main body, enabling beforehand operation of the motor to drive a wheel to reach the preset speed. Once a trigger switch is activated, magnetic force is generated by an electromagnet for attracting a cam to pivot and be pushed by a driving block of the wheel, causing temporary synchronous rotation state of a pulley and the wheel and displacement of the striking nail mechanism indirectly induced by engagement between the pulley and belt for nailing action.

10 Claims, 16 Drawing Sheets

ELECTRIC NAIL GUN AND OPERATING METHOD THEREOF

BACKGROUND OF THE INVENTION

Fields of the Invention

The present invention relates to a nail gun, and more particularly, to an electric nail gun and an operating method thereof.

Descriptions of Related Art

Electric nail guns are of both plug-in and lithium battery-powered types. The driving methods for electric nail guns include flywheel drive, compression spring, internal storage of high-pressure gas and so on. Currently known flywheel drive mechanism transfers the rotational kinetic energy of the flywheel to a sliding seat through momentary contact between the flywheel and the sliding seat. This drives a striker to fire and insert the nail into a target object. In the above process, there is energy loss during the transfer of kinetic energy, and it also takes time for the flywheel to reach the working speed. Additionally, the momentary contact friction also affects the durability.

SUMMARY OF THE INVENTION

The present invention provides an electric nail gun, including a main body, a limiting mechanism, an active mechanism, a passive mechanism, a magnetic attraction mechanism, a striking nail mechanism, a safety mechanism and a lithium battery case. The main body includes a housing section, a handle section, a buttstock section, and a nail magazine section. The handle section is connected to both the housing section and the buttstock section. The handle section includes a holding area and a trigger area adjacent to each other. A motor switch and a trigger switch are disposed, respectively, at the holding area and a trigger area. The housing section has frame plates spaced and arranged therein. One end of the housing section is assembled with a head assembly. The nail magazine section is connected to the head assembly and the buttstock section. The buttstock section is provided with a power switch. The limiting mechanism includes an initial rod and a terminal rod spaced from each other and disposed between the frame plates. The terminal rod is located closer to the head assembly than the initial rod. The passive mechanism is located between the frame plates and includes a pulley, a steering wheel and a belt. The belt is wrapped around the steering wheel and the pulley and in contact with and engaged with the pulley. The magnetic attraction mechanism includes an electromagnet and a cam. The electromagnet is assembled on an outer side of the frame plate and located at a plate hole of the frame plate. The cam is pivotally disposed in a groove of the pulley. A wheel hole is disposed at a bottom of the groove and corresponds to the plate hole of the frame plate and a magnetic attraction end of the cam. The active mechanism is located within the housing section of the main body and includes a motor and a wheel driven by the motor for rotation. The wheel features a driving block that faces the pulley. The striking nail mechanism includes a fixed seat and a striker. The fixed seat is secured on the belt and located between the initial rod and the terminal rod. The striker has one end fixed at the fixed seat and the other end facing towards the head assembly. The safety mechanism is disposed at the head assembly and includes a safety switch and a safety slider. The lithium battery case is connected to the buttstock section and provides electrical connections to the motor, the electromagnet, the power switch, the motor switch, the safety switch and the trigger switch.

With the aforementioned configuration, the present invention allows users to activate the motor switch while holding the main body, enabling beforehand operation of the motor to drive the wheel to reach the preset speed. Once the trigger switch is activated, the electromagnet generates magnetic force for attracting the cam to pivot and be pushed by the driving block of the wheel, causing temporary synchronous rotation state of the pulley and the wheel and displacement of the striking nail mechanism indirectly induced by engagement between the pulley and belt for nailing action.

The present invention also provides an operating method of an electric nail gun, including following steps: a step of turning on a power switch by first activating the power switch located at a buttstock of a main body; a step of turning on a motor switch by grasping a holding area of the main body and simultaneously activating the motor switch located at the holding area, causing a motor to drive a wheel and maintain continuous rotation; a step of turning on a safety switch by moving the electric nail gun to a target object, followed by making a safety slider to be against the target object and to simultaneously slide on the head assembly, thereby triggering the safety switch; and a step of turning on a trigger switch by activating the trigger switch at a trigger area of a handle section to generate magnetic force from an electromagnet so as to attract a cam for pivot motion and cause a protruding end of the cam to partially protrude outward from a groove of a pulley and then to be pushed by a driving block of the wheel, which enables the wheel to initiate rotation of the pulley from an initial state and the pulley synchronously to drive a belt through engagement therebetween, allowing movement of a striking nail mechanism from an initial position to a nailing position.

DETAILED DESCRIPTION OF THE PREFERRED EMBODIMENT

Figure 1:
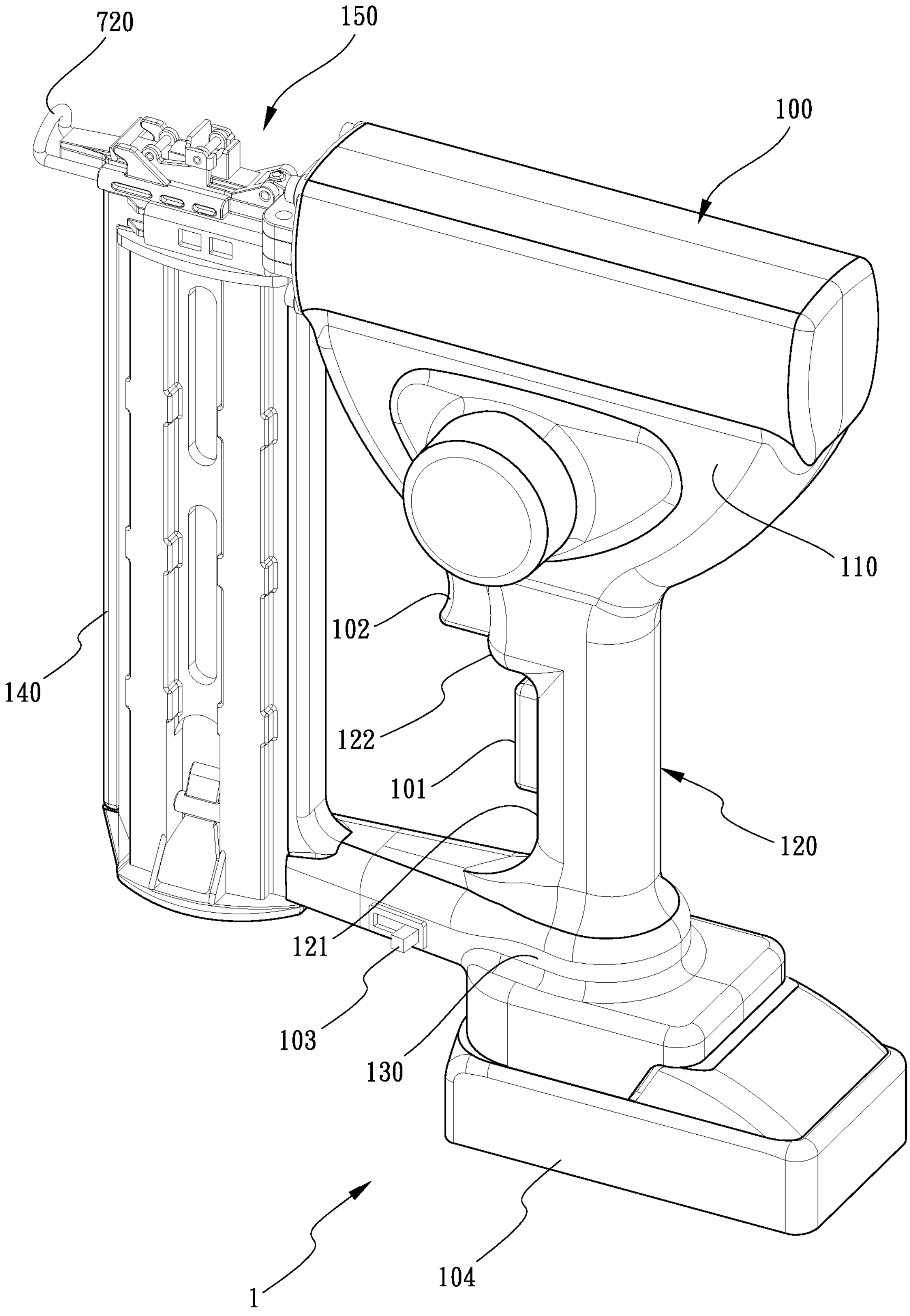
FIG. 1 is an assembled perspective view of the present invention.
Figure 2:
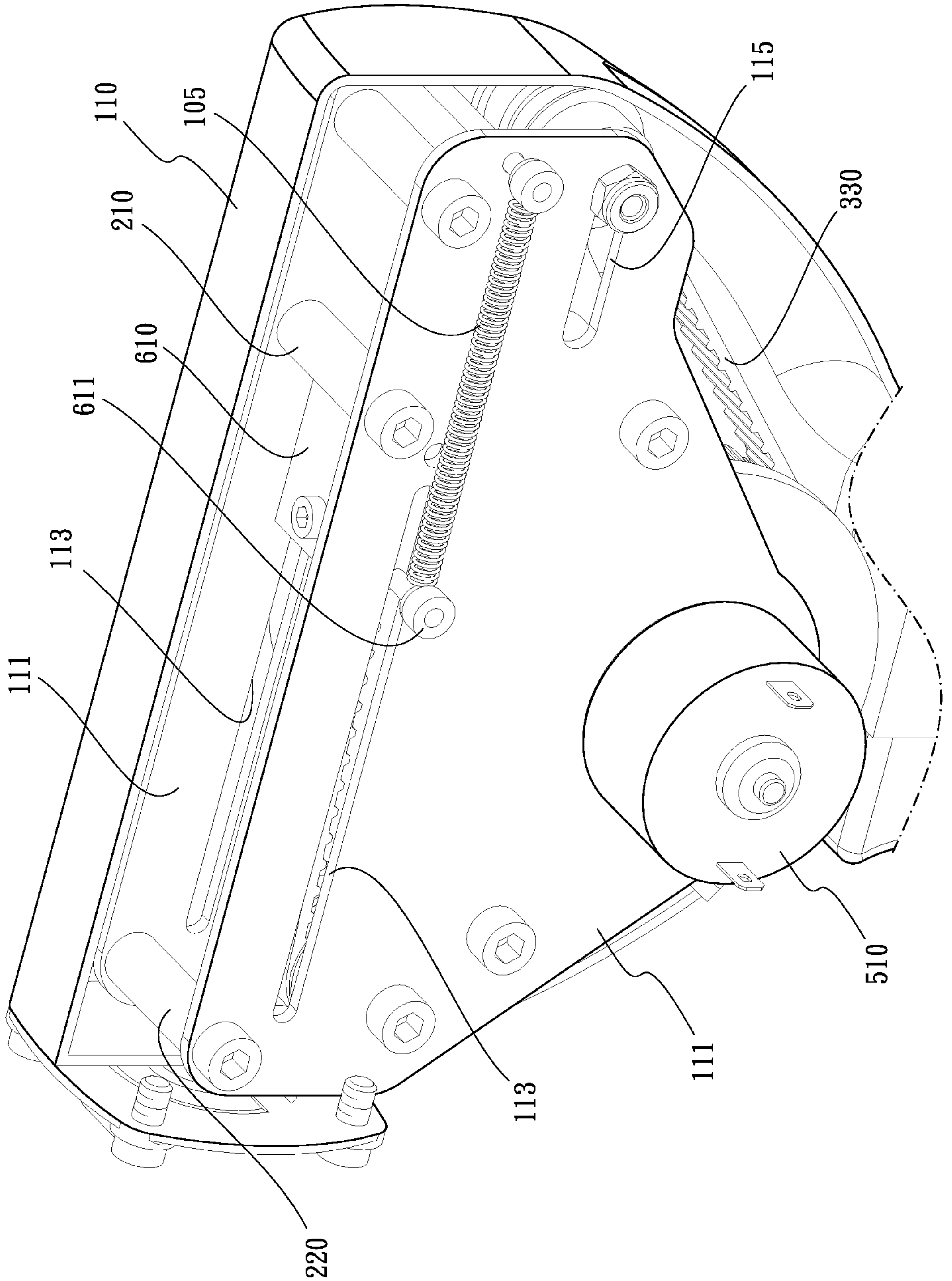
FIG. 2 is an enlarged partial view of the present invention with a portion of the main body omitted.
Figure 3:
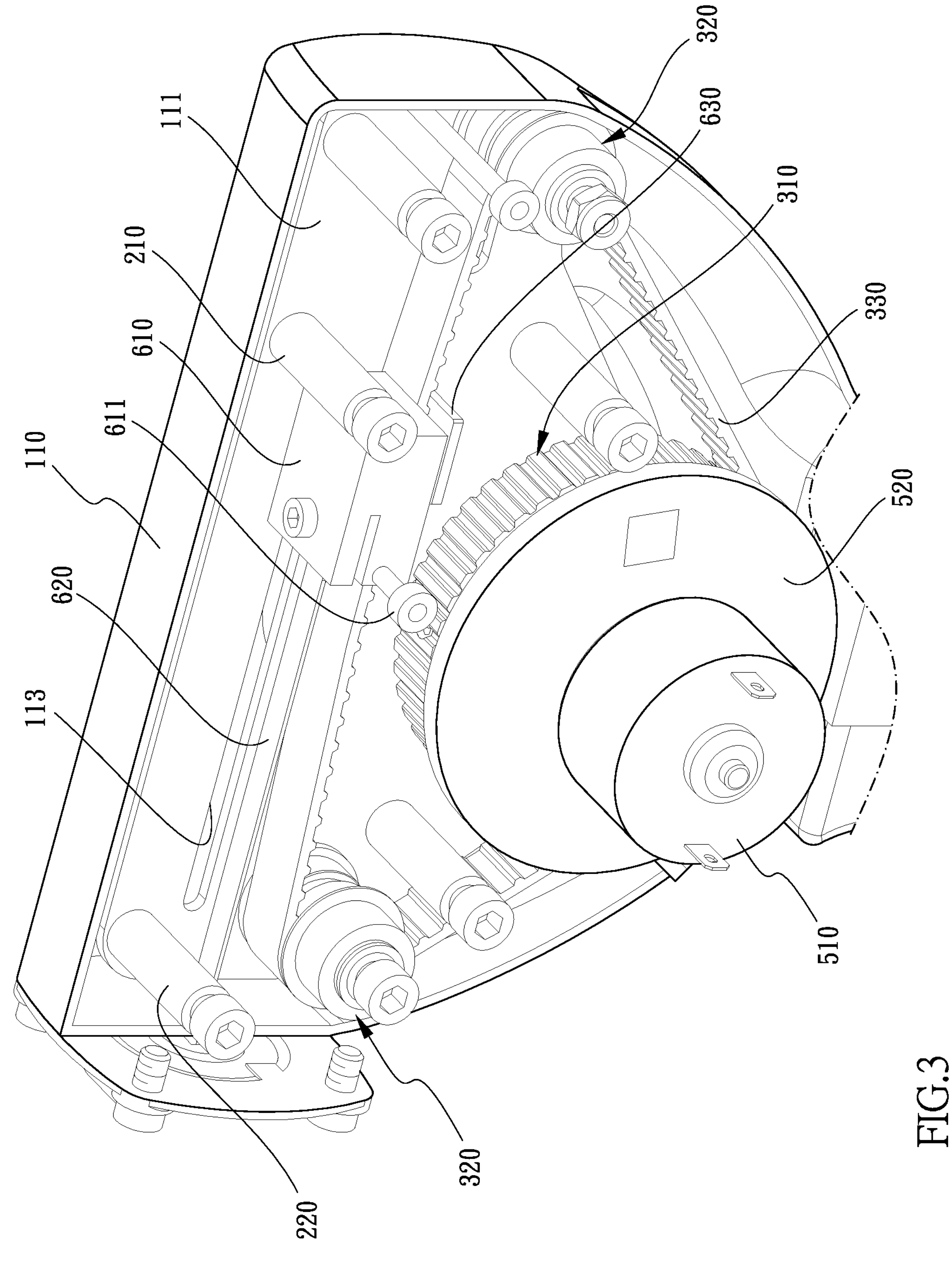
FIG. 3 is a perspective view of FIG. 2 with a portion of the frame plate omitted.
Figure 4:
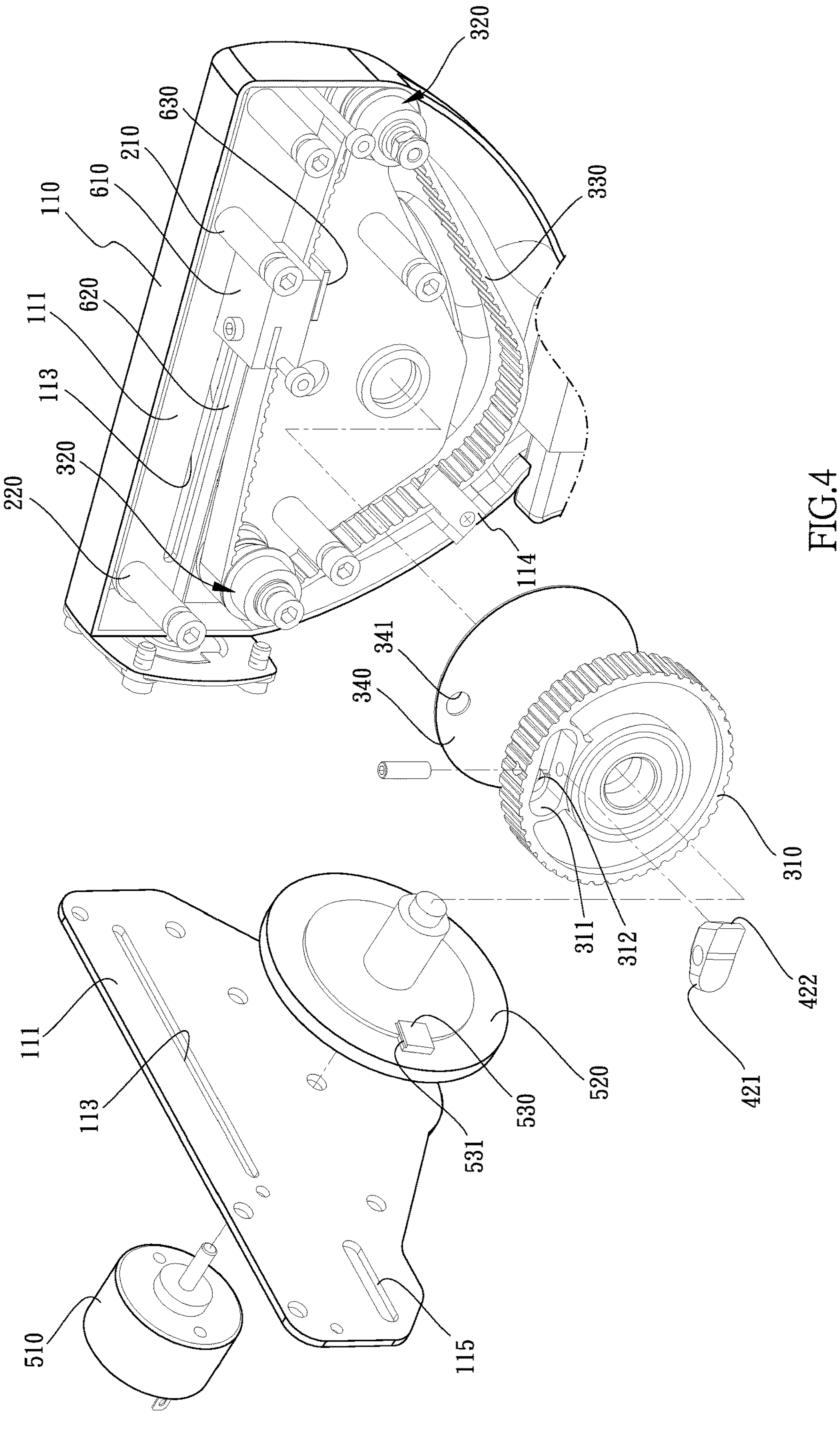
FIG. 4 is an exploded partial perspective view of the present invention.
Figure 5:
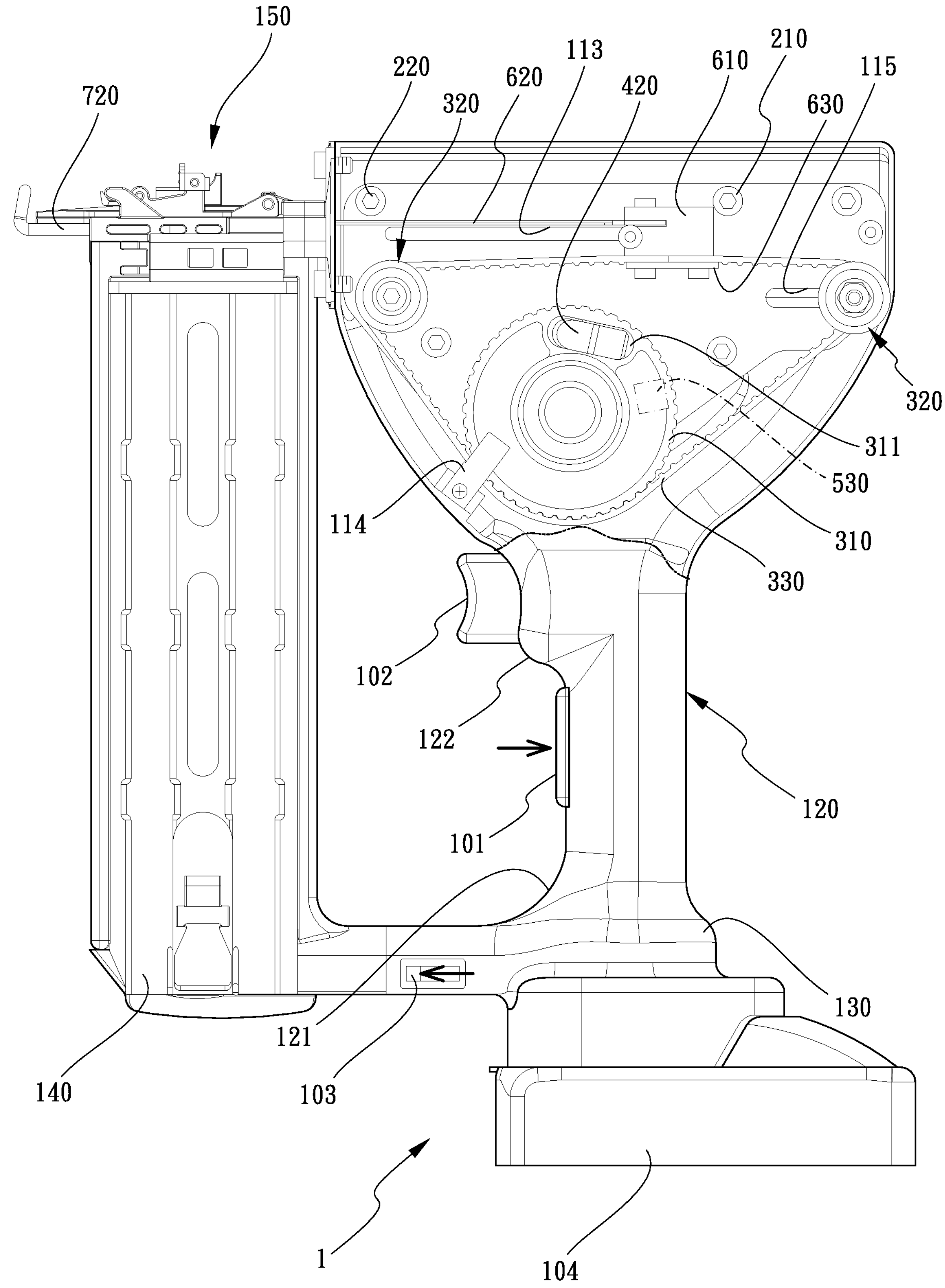
FIG. 5 is a schematic view for illustrating activation of the power switch and the motor switch and rotation of the wheel in accordance with the present invention.
Figure 6:
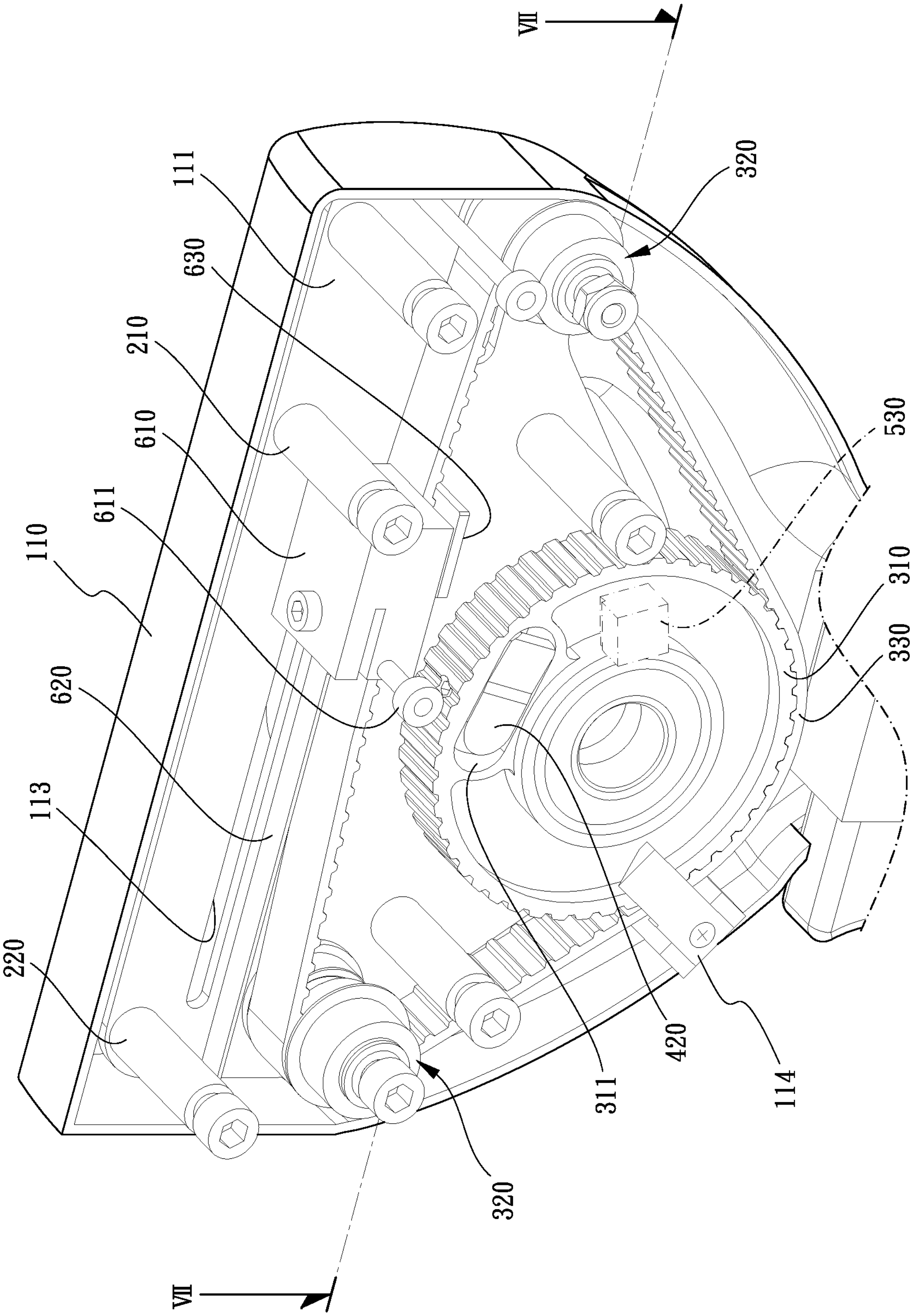
FIG. 6 is a schematic view for illustrating configuration of the passive mechanism and the magnetic attraction mechanism in accordance with the present invention.
Figure 7:
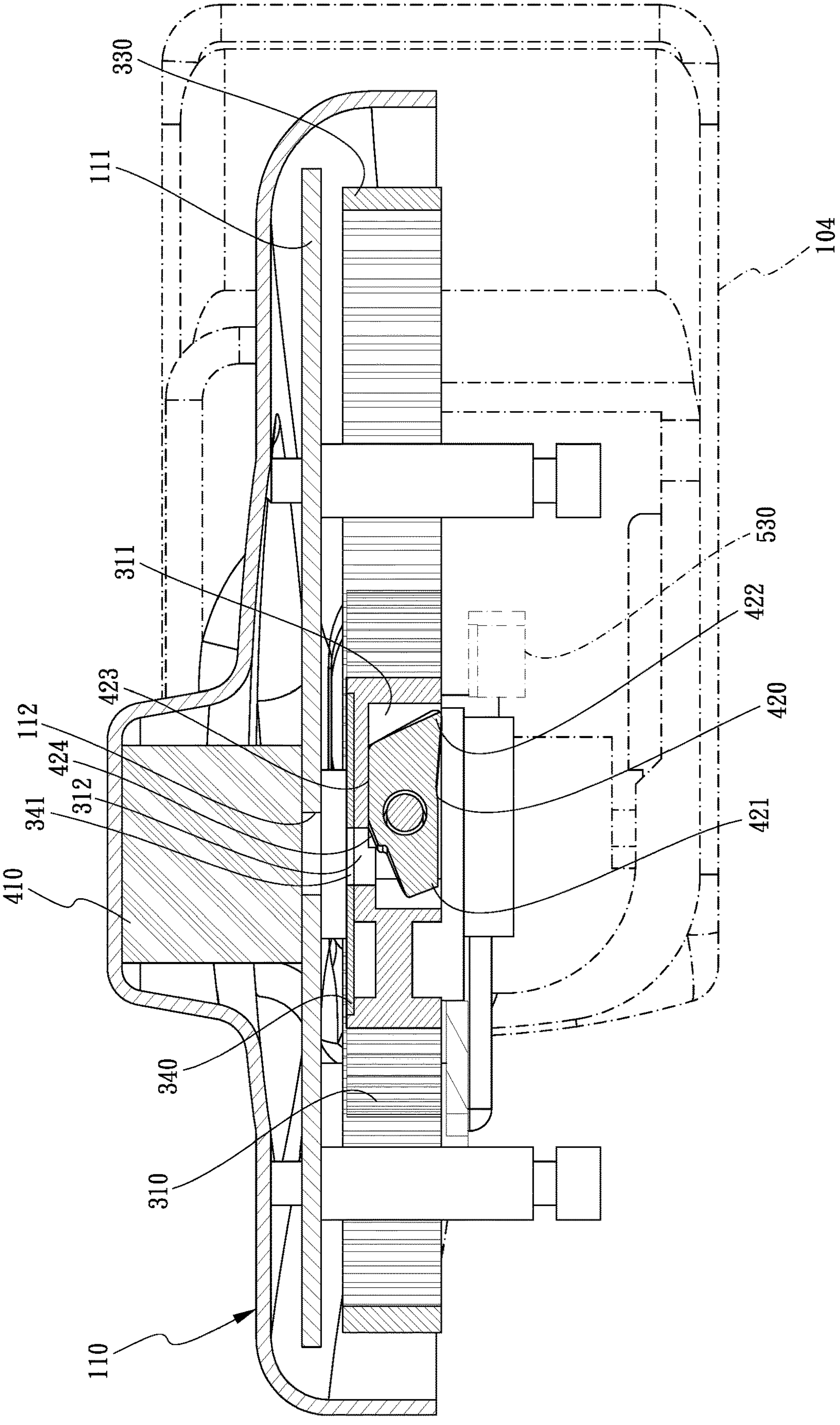
FIG. 7 is a cross-sectional schematic view of FIG. 6 taken along the line VII-VII.
Figure 8:
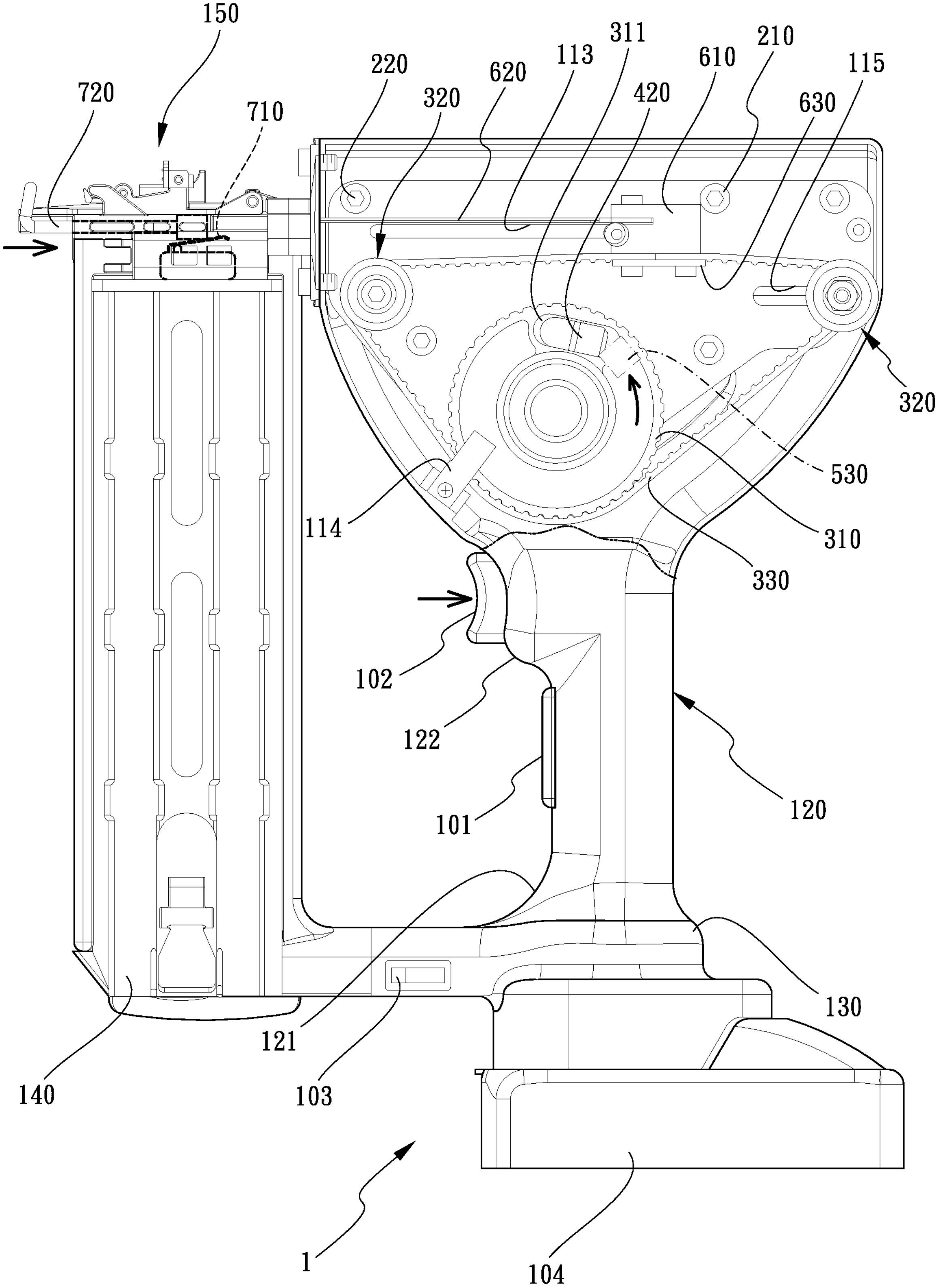
FIG. 8 is a schematic view for illustrating displacement of the safety slider and activation of the trigger switch in accordance with the present invention.
Figure 9:
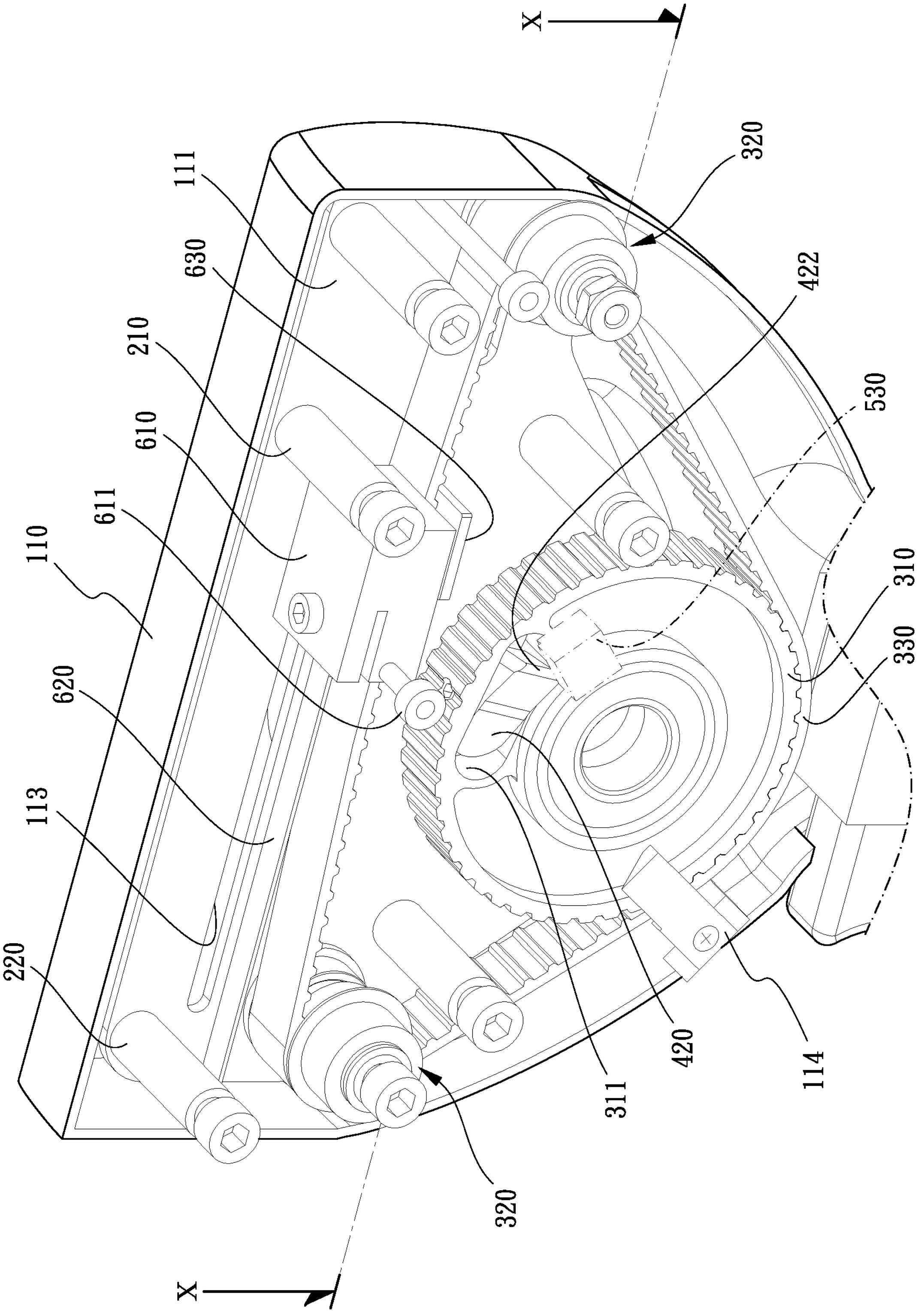
FIG. 9 is a schematic view for illustrating that the protruding end of the cam protrudes outside the groove in accordance with the present invention.
Figure 10:
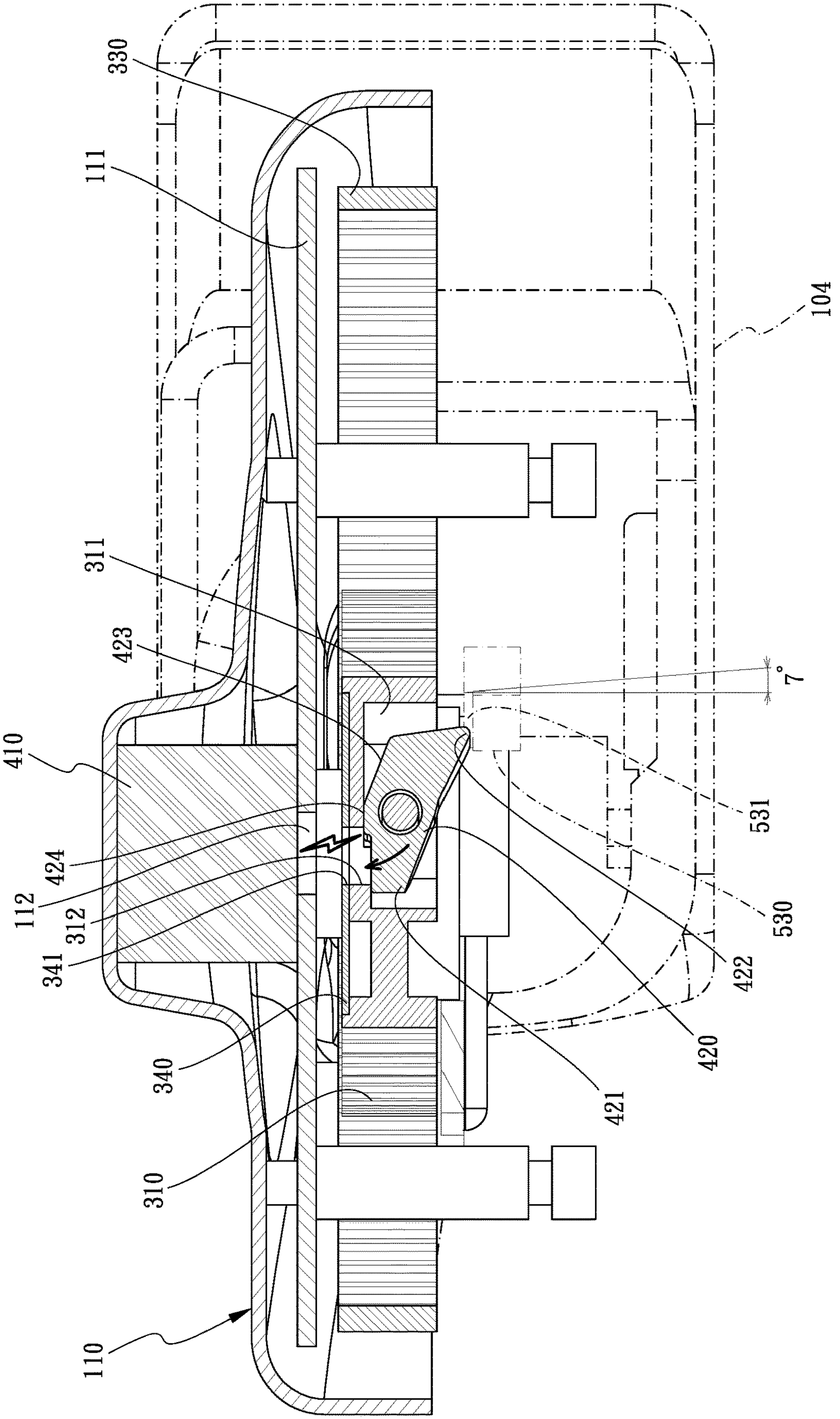
FIG. 10 is a cross-sectional schematic view of FIG. 9 taken along the line X-X.
Figure 11:
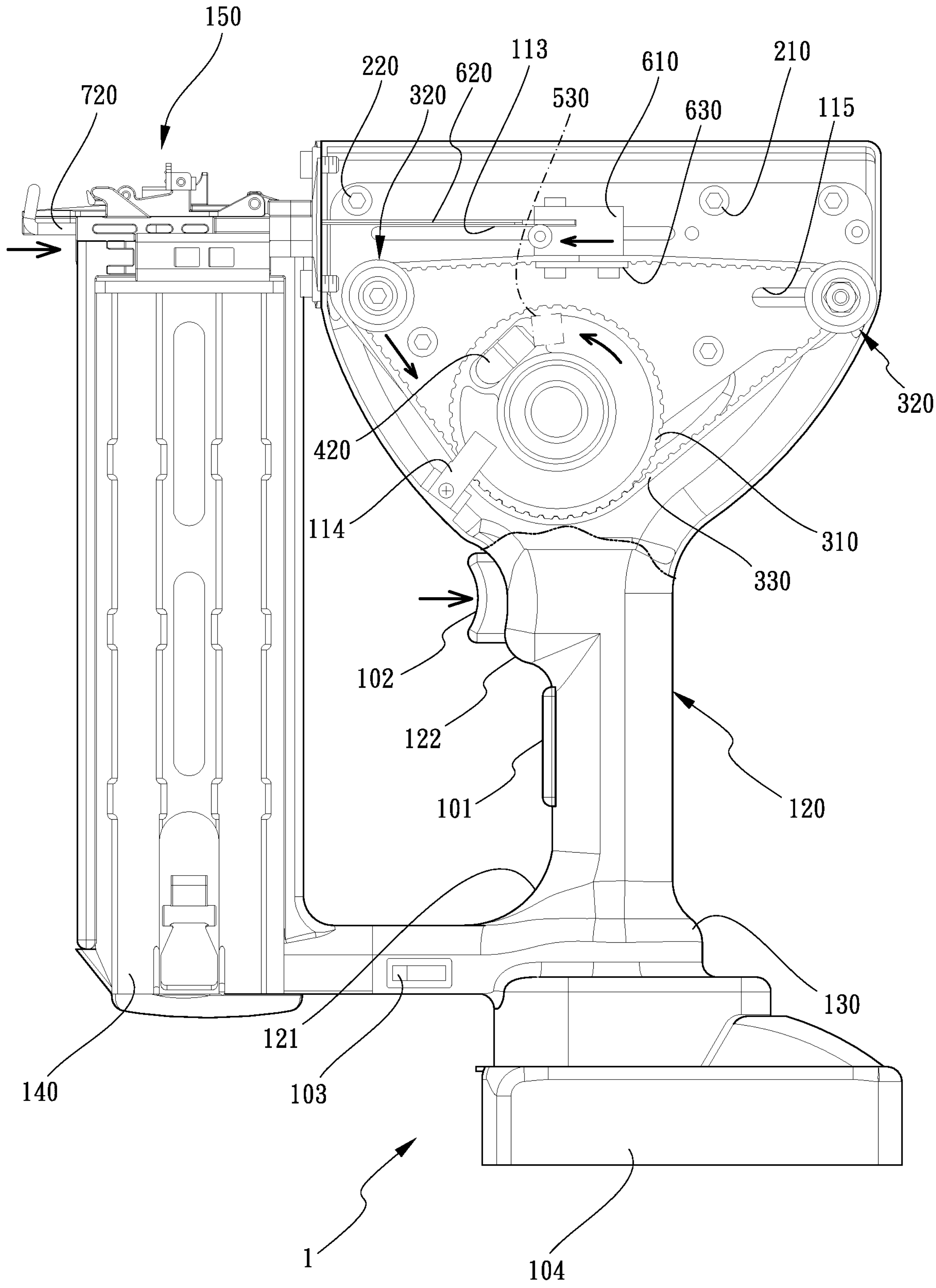
FIG. 11 is a schematic view for illustrating that the belt forces the striking nail mechanism to shift towards the head assembly.
Figure 12:
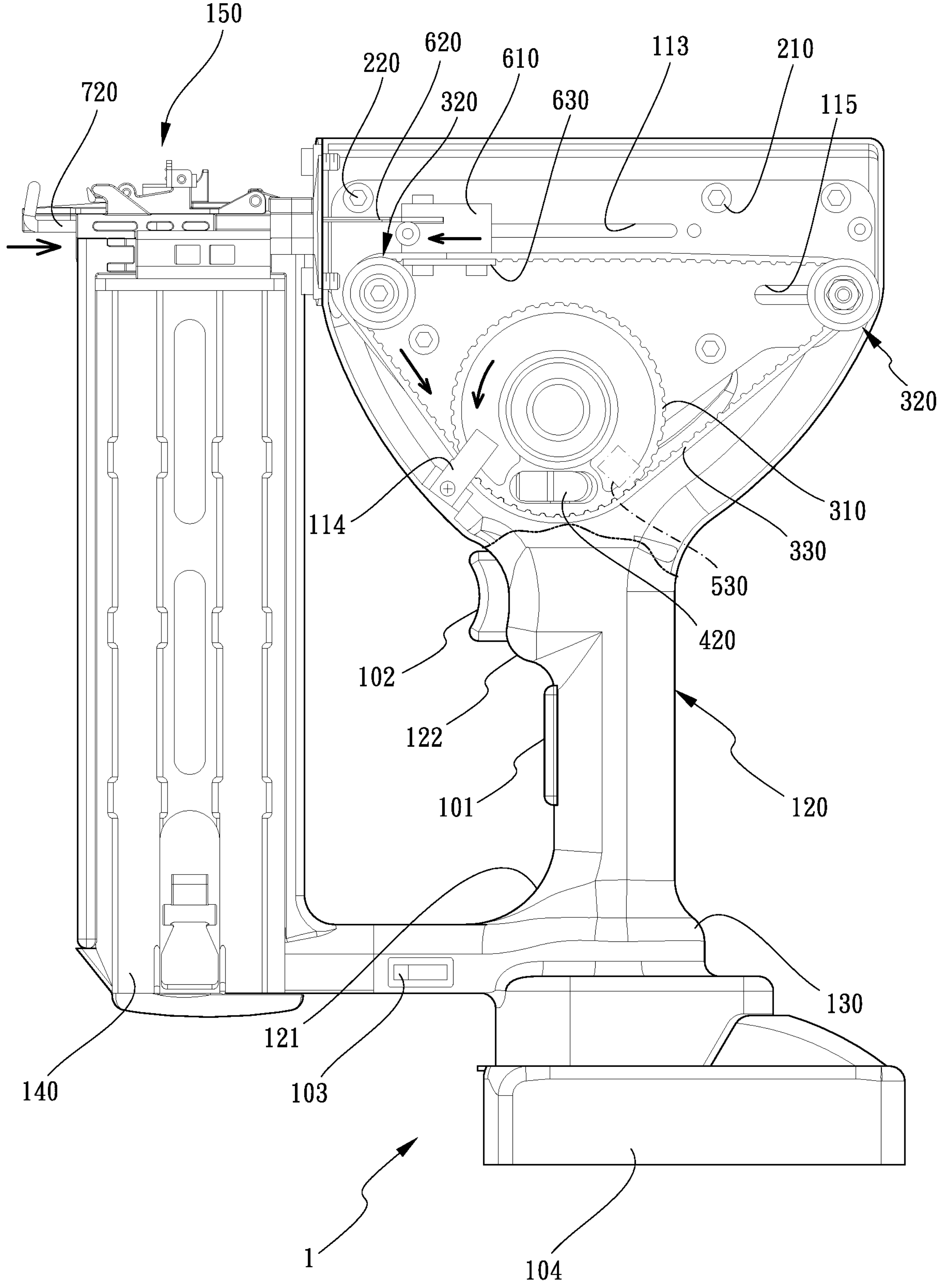
FIG. 12 is a schematic view for illustrating that the striking nail mechanism is shifted to the position at the terminal rod.

Please refer to FIGS. 1 to 12 for the illustration of an electric nail gun 1, which includes a main body 100, a limiting mechanism, a passive mechanism, a magnetic attraction mechanism, an active mechanism, a striking nail mechanism, a safety mechanism, and a lithium battery case 104.

The main body 100 includes a housing section 110, a handle section 120, a buttstock section 130, and a nail magazine section 140. The handle section 120 is connected to both the housing section 110 and the buttstock section. The handle section 120 includes a holding area 121 and a trigger area 122, which are adjacent to each other but at different levels. The holding area 121 and the trigger area 122 are provided with a motor switch 101 and a trigger switch 102, respectively. The housing section 110 contains frame plates 111 spaced and arranged therein. One end of the housing section 110 is assembled with a head assembly 150. The nail magazine section 140 is connected to the head assembly 150 and the buttstock section 130. The buttstock section 130 is provided with a power switch 103. The aforementioned main body 100 is generally formed by combining two shells in the lateral direction, except for the nail magazine section 140.

The limiting mechanism includes an initial rod 210 and a terminal rod 220, which are spaced from each other and disposed between the frame plates 111. The terminal rod 220 is closer to the head assembly 150 than the initial rod 210. Both the initial rod 210 and the terminal rod 220 are covered with an elastic material such as rubber or foam around their perimeters. Accordingly, the elastic material can undergo deformed and absorb the impact force during the displacement collision of the striking nail mechanism, preventing direct structural damage.

The passive mechanism is located between the frame plates 111 and includes a pulley 310, a steering wheel 320, and a belt 330. The belt 330 is wrapped around the steering wheel 320 and the pulley 310 and in contact with and engaged with the pulley 310. In this example, the belt 330 is a timing belt that can engage the outer peripheral edge of the pulley 310, while the steering wheel 320 is illustrated as two steering wheels.

The magnetic attraction mechanism includes an electromagnet 410 and a cam 420. The electromagnet 410 is assembled on an outer side of the frame plate and located at a plate hole 112 of the frame plate 111. The cam 420 is pivotally disposed in the a groove 311 of the pulley 310, and a wheel hole 312 is formed at the bottom of the groove 311 and corresponds to the plate hole 112 of the frame plate 111 and a magnetic attraction end 421 of the cam 420. The cam 420 is made of ferromagnetic material and is mounted at the groove 311 by means of a shaft member passing therethrough to enable pivot motion of the cam 420 relative to the shaft member.

The active mechanism is located within the housing section 110 of the main body 100, and incudes a motor 510 and a wheel 520 driven by the motor 510 to rotate. The wheel 520 has a driving block 530 facing the pulley 310. The motor 510, for example, can reach a speed of over 8000 revolutions per minute (RPM).

The striking nail mechanism includes a fixed seat 610 and a striker 620. The fixed seat 610 is secured on the belt 330 and located between the initial rod 210 and the terminal rod 220. The striker 620 has one end fixed at the fixed seat 610 and the other end facing towards the head assembly 150.

The safety mechanism is disposed at the head assembly 150 and includes a safety switch 710 and a safety slider 720.

Figure 13:
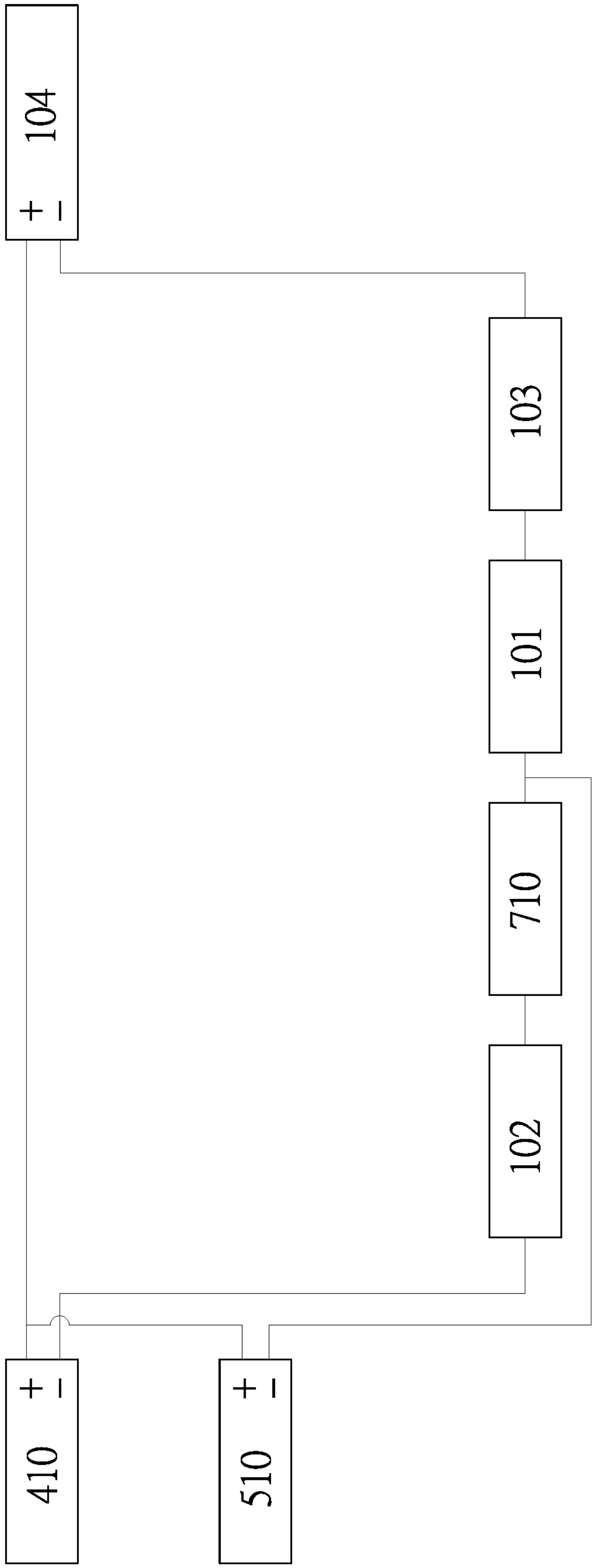
FIG. 13 is a schematic view for illustrating the circuit configuration of the electric nail gun.

The lithium battery case 104 is connected to the buttstock section 130 and provides electrical connections to the motor 510, the electromagnet 410, the power switch 103, the motor switch 101, the safety switch 710, and the trigger switch 102, as shown in FIG. 13. The power switch 103, the motor switch 101, the safety switch 710, and the trigger switch 102 are connected to the negative electrode of the lithium battery case 104.

During actual use, when the power switch 103 and the motor switch 101 are turned on in sequence, the motor 510 is activated to cause rotation of the wheel 520. As the motor switch 101 is located at the holding area 121, users naturally grip the holding section 121 when holding the electric nail gun 1. This action can inadvertently press the motor switch 101, enabling the motor 510 to operate and drive the wheel 520 to rotate as long as the power switch 103 is in the ON state. While moving the electric nail gun 1 and pressing the safety slider 720 against a target object, the slide motion of the head assembly 150 would trigger the safety switch 710. By pressing the trigger switch 102, the electromagnet 410 operates, generating a magnetic force that attracts the magnetic attraction end 421 of the cam 420 to pivot towards the plate hole 112. This causes the protruding end 422 of the cam 420 to partially protrude outward from the groove 311. Upon the wheel 520 in rotation motion causes the impact face 531 of the driving block 530 to contact and push the protruding end 422, the rotation of the pulley 310 is activated by the wheel 520 from its initial state and synchronously drives the belt 330 through engagement between the pulley 310 and the belt 330, enabling movement of the fixed seat 610 of the striking nail mechanism from the initial position at the initial rod 210 to the nailing position at the terminal rod 220.

The detailed features of the electric nail gun 1 according to the present invention and the effect achieved by their mutual operation are described. The frame plates 111 are formed with slide rails 113 that penetrate through the inner surface and the outer surface thereof. The slide rails 113 each have two ends extending towards the initial rod 210 and the terminal rod 220, respectively. The fixed seat 610 is equipped with a slide rod 611 that can slide along the slide rail 113, enabling the displacement trajectory of the slide rod 611 for the fixed seat 610 along the slide rails 113.

In this embodiment, the housing section 110 is equipped with a pressure plate 114 therein that has one end extending between the frame plates 111. When the wheel 520 makes contact with the protruding end 422 outside the groove 311 through the impact face 531 and indirectly drives the pulley 310 to the position of the pressure plate 114, the protruding end 422 of the cam 420 is limited by the pressure plate 114 to retract and move into the groove 311 to be unexposed.

This action leads to a disengaged state where the wheel 520 can no longer continuously drive the pulley 310. Consequently, the pulley 310 rotates no more than one complete turn from its initial state to the disengaged state.

In this embodiment, the outer surface of the frame plate 111 is equipped with one end of a spring 105, while the other end of the spring 105 is disposed at the slide rod 611. This configuration allows the spring 105 to be stretched and store energy during firing. After the firing is completed, the recovery force of the spring 105 drives the striking nail mechanism to reset, and simultaneously, the belt 330 drives the pulley 310 to reset.

In this embodiment, the frame plate 111 is formed with a tension track 115 that penetrates through the inner surface and the outer surface thereof. A portion of the steering wheel 320 is movably disposed at the tension track 115 that has two ends extending towards and away from the head assembly 150, respectively. This configuration allows for the adjustment of the tension of the belt 330, ensuring that the pulley 310 is accurately positioned in the initial state and the cam 420 can be prepositioned at an appropriate location to facilitate pivot motion through magnetic attraction by the electromagnet 41

In this embodiment, the fixed seat 610 and the fixed plate 630 secure the two ends of the belt 330 in a non-overlapping state. The fixed seat 610 and the fixed plate 630 are respectively located on the upper and lower surfaces of the belt 330 and are fastened with bolts. This configuration not only enables a secure connection between the striking nail mechanism and the belt 330 but also establishes a loop-shaped connection between both ends of the belt 330. As such, the belt 330 can be smoothly wrapped around the steering wheel 320 and the pulley 310.

In this embodiment, the side of the pulley 310, facing the electromagnet 410, is assembled with a shield plate 340. The shield plate 340 is formed with a shielding hole 341 corresponding to the wheel hole 312 and is made of a material with poor magnetic permeability (aluminum material). Under this configuration, while the electromagnet 410 is in operation, the shield plate 340 can serve to limit and obstruct magnetic direction, thereby reducting direct interference with the pulley 310 during the operation of the electromagnet 410. Accordingly, the magnetic force can pass through the shielding hole 341 and attract the cam 420 to pivot within the groove 311, so that a portion of the protruding end 422 smoothly moves outside the groove 311.

In this embodiment, the impact face 531 of the driving block 530 gradually expands from the wheel 520 (defined as an inward end) towards the direction away from the wheel 520 (defined as an outward end), forming an angle of 7 degrees between the inward end and the outward end. With this structural configuration, when the driving block 530 is about to come into contact with the cam 420 and rotate along with it, the inclined impact face 531 of the driving block 530 would instantly contact the surface of the protruding end 422 located outside the groove 311. By avoiding direct flat contact therebetween, the driving block 530 can better withstand the instantaneous reactive force when it contacts the cam 420. This structural configuration utilized by the aforementioned technology can enhance the durability of the driving block 530 of the wheel 520.

In this embodiment, the cam 420 has a retracted surface 423 and a raised surface 424, both generally facing the bottom surface of the groove 311. The retracted surface 423 and the raised surface 424 are not the same surface. When the cam 420, the magnetic attraction end 421 and the protruding end 422 are within the groove 311, the retracted surface 423 of the cam 420 contacts the bottom surface of the groove 311. However, when the protruding end 422 of the cam 420 partially extends outside the groove 311, the raised surface 424 of the cam 420 contacts the bottom surface of the groove 311. With the aforementioned structural configuration, especially when the raised surface 424 contacts the bottom surface of the groove 311, the force exerted by the driving block 530 on the cam 420 can be partially transferred to the bottom surface of the groove 311. This prevents the concentration of forces solely on the cam 420 and the shaft member, thereby enhancing the durability of the product.

Figure 14:
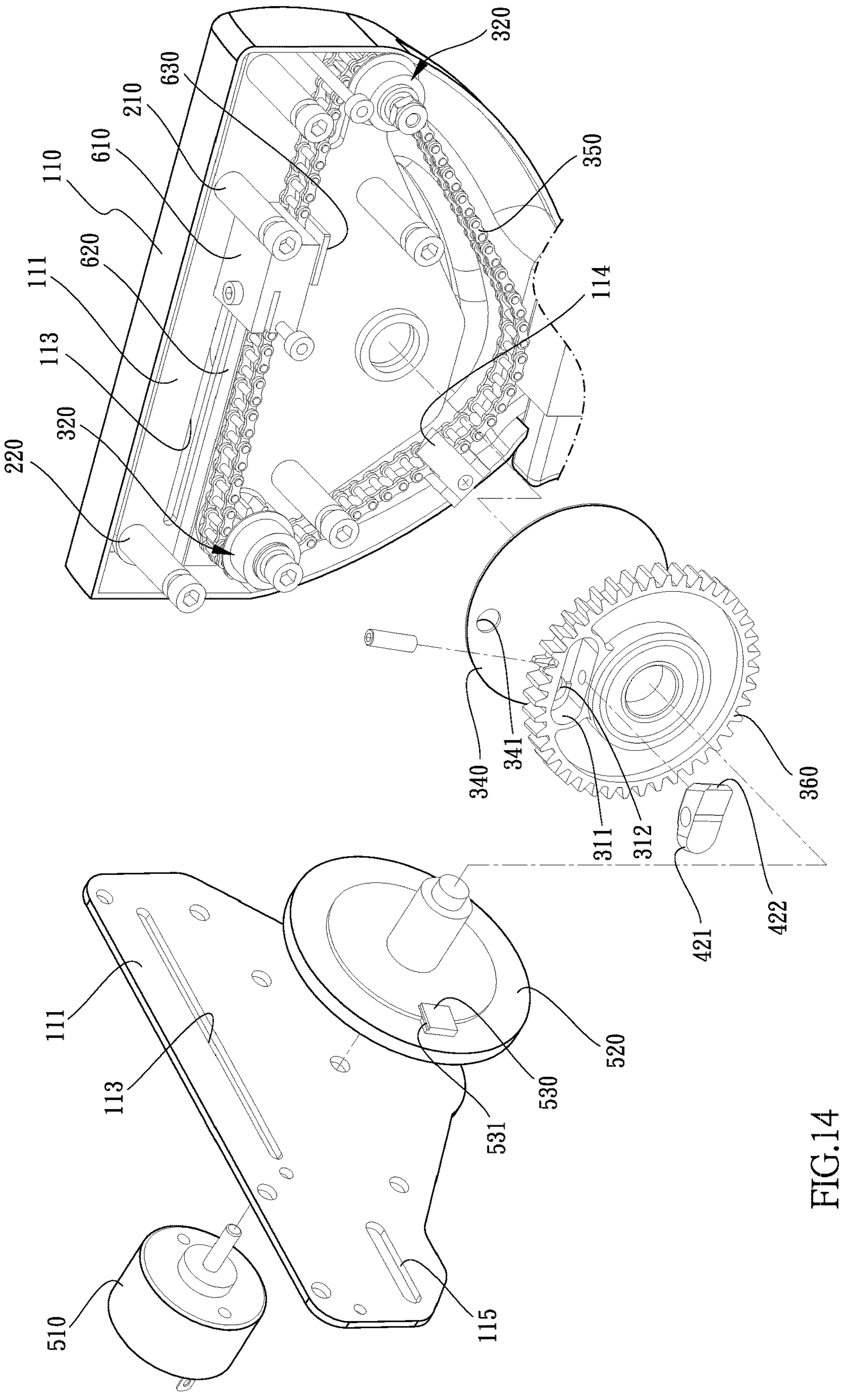
FIG. 14 is an exploded partial perspective schematic view in accordance with another embodiment of the present invention.
Figure 15:
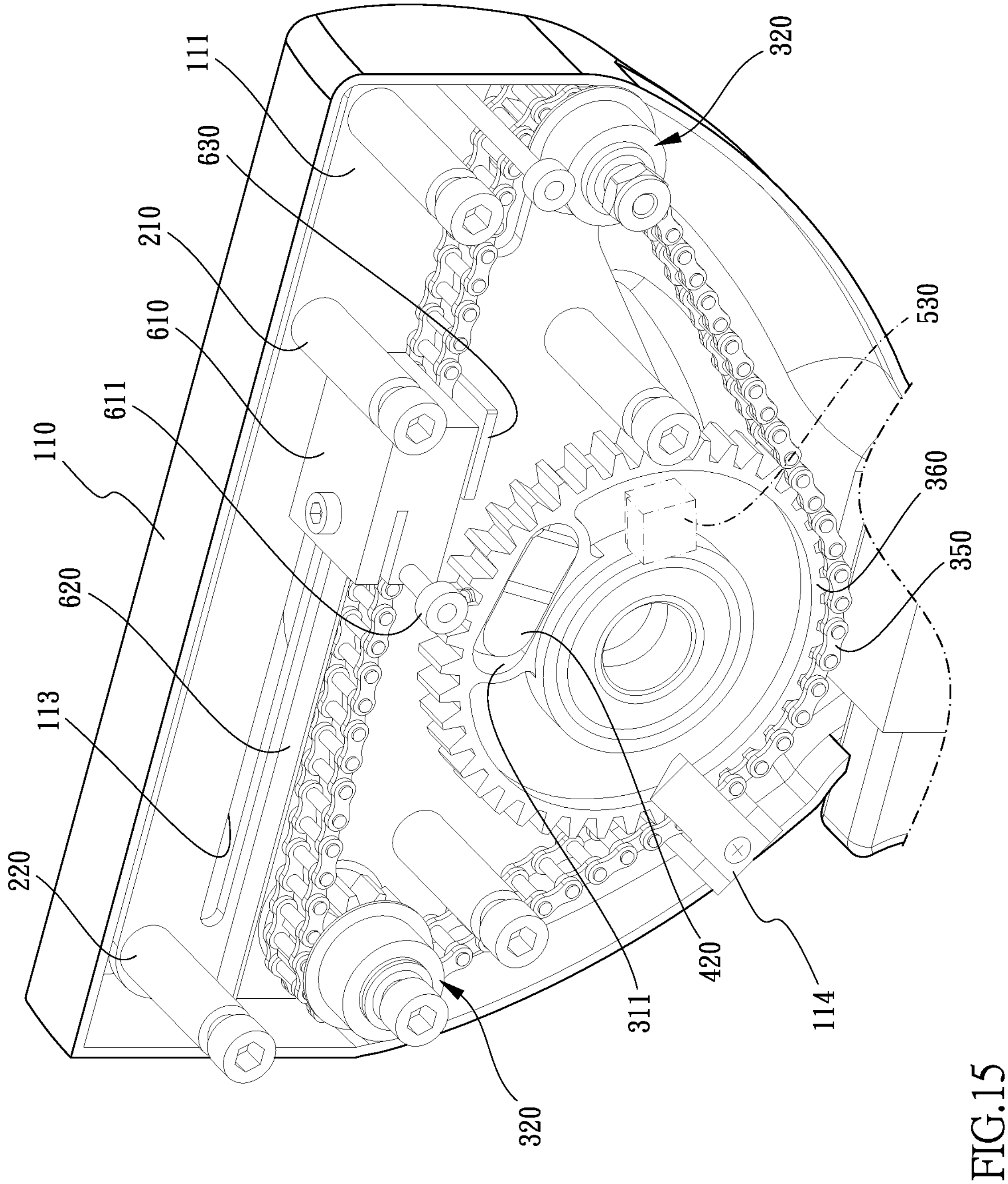
FIG. 15 is an assembled partial perspective schematic view in accordance with another embodiment of the present invention.

In the above-mentioned embodiment of the electric nail gun 1 according to the present invention, an alternative transmission mode can be employed. Instead of relying on the engagement between the belt 330 and the pulley 310, a chain 350 and a gear 360 can serve as the transmission mechanism. This mode utilizes the interaction between the gear 360 and the chain 350, as illustrated in FIGS. 14 and 15.

Figure 16:
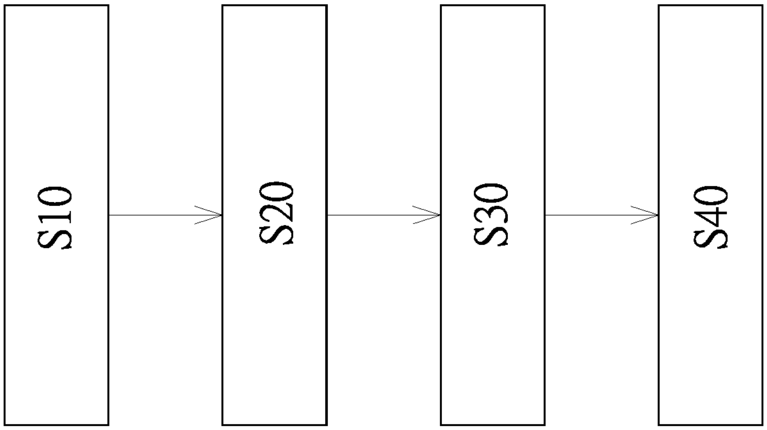
FIG. 16 is an operational flowchart of the electric nail gun.

Please refer to FIG. 16 for illustration of an operating method of an electric nail gun, including the following steps:

Step S10: turning on the power switch by first activating the power switch 103 located at the buttstock 130 of the main body 100;

Step S20: turning on the motor switch by grasping the holding area 121 of the main body 100 and simultaneously activating the motor switch 101 located at the holding area 121, causing the motor 510 to drive the wheel 520 and maintain continuous rotation;

Step S30: turning on the safety switch by moving the electric nail gun 1 to the target object, followed by making the safety slider 720 to be against the target object and to simultaneously slide on the head assembly 150, thereby triggering the safety switch 710; and Step S40: turning on the trigger switch by activating the trigger switch 102 at the trigger area 122 of the handle section 120 to generate magnetic force from the electromagnet so as to attract the cam 420 for pivot motion and cause the protruding end 422 of the cam 420 to partially protrude outward from the groove 311 of the pulley 310 and then to be pushed by the driving block 530 of the wheel 520, which enables the wheel 520 to initiate rotation of the pulley 310 from an initial state and the pulley 310 synchronously to drive the belt 330 through engagement therebetween, allowing movement of the striking nail mechanism from an initial position to a nailing position.

What is claimed is:

1. An electric nail gun, comprising a main body, a limiting mechanism, an active mechanism, a passive mechanism, a magnetic attraction mechanism, a striking nail mechanism, a safety mechanism and a lithium battery case, wherein:

the main body includes a housing section, a handle section, a buttstock section, and a nail magazine section, wherein: (i) the handle section is connected to both the housing section and the buttstock section, (ii) the handle section includes a holding area and a trigger area adjacent to each other, with a motor switch and a trigger switch being disposed, respectively, at the holding area and a trigger area, (iii) the housing section has frame plates spaced and arranged therein, (iv) one end of the housing section is assembled with a head assembly, (v) the nail magazine section is connected to the head assembly and the buttstock section, and (vi) the buttstock section is provided with a power switch;

the limiting mechanism includes an initial rod and a terminal rod spaced from each other and disposed between the frame plates, the terminal rod being closer to the head assembly than the initial rod;

the passive mechanism is located between the frame plates and includes a pulley, a steering wheel, and a belt, wherein the belt is wrapped around the steering wheel and the pulley and in contact with and engaged with the pulley;

the magnetic attraction mechanism includes an electromagnet and a cam, wherein (i) the electromagnet is assembled on an outer side of the frame plate and located at a plate hole of the frame plate, (ii) the cam is pivotally disposed in a groove of the pulley, with a wheel hole being disposed at a bottom of the groove and corresponding to the plate hole of the frame plate and a magnetic attraction end of the cam, and (iii) the electromagnet generates magnetic force during operation, attracting the magnetic attraction end of the cam to pivot towards the plate hole and thus causing a protruding end of the cam to partially protrude outside the groove;

the active mechanism is located within the housing section of the main body and includes a motor and a wheel driven by the motor for rotation, wherein the wheel features a driving block that faces the pulley and has a impact face able to contact the protruding end outside the groove, thus allowing the wheel to initiate rotation of the pulley from an initial state;

the striking nail mechanism includes a fixed seat and a striker, wherein (i) the fixed seat is secured on the belt and located between the initial rod and the terminal rod, (ii) the striker has one end fixed at the fixed seat and the other end facing towards the head assembly, and (iii) the fixed seat of the striking nail mechanism is movable from an initial position at the initial rod to a nailing position at the terminal rod;

the safety mechanism is disposed at the head assembly and includes a safety switch and a safety slider; and the lithium battery case is connected to the buttstock section and provides electrical connections to the motor, the electromagnet, the power switch, the motor switch, the safety switch and the trigger switch.

2. The electric nail gun as claimed in claim 1, wherein each of the frame plates is formed with a slide rail that penetrates through an inner surface and an outer surface and has two ends extending towards the initial rod and the terminal rod, respectively; and the fixed seat is equipped with a slide rod slidable along the slide rail.

3. The electric nail gun as claimed in claim 2, wherein the outer surface of the frame plate is equipped with one end of a spring, while the other end of the spring is disposed on the slide rod.

4. The electric nail gun as claimed in claim 1, wherein the housing section is equipped with a pressure plate therein that has one end extending between the frame plates; and when the wheel makes contact with the protruding end outside the groove through the impact face and indirectly drives the pulley to a position of the pressure plate, the protruding end of the cam is limited by the pressure plate to retract and move into the groove to be unexposed, resulting in a disengaged state in which the wheel cannot drive the pulley.

5. The electric nail gun as claimed in claim 1, wherein the frame plate is formed with a tension track that penetrates through an inner surface and an outer surface thereof to allow a portion of the steering wheel to be movably disposed therein and has two ends extending towards and away from the head assembly, respectively.

6. The electric nail gun as claimed in claim 1, wherein the fixed seat and a fixed plate secure two ends of the belt in a non-overlapping state, and the fixed seat and the fixed plate are respectively located on an upper surface and a lower surface of the belt and are fastened with bolts.

7. The electric nail gun as claimed in claim 1, wherein one side of the pulley, facing the electromagnet, is assembled with a shield plate that is formed with a shielding hole corresponding to the wheel hole and made of a material with poor magnetic permeability.

8. The electric nail gun as claimed in claim 1, wherein the impact face gradually expands from the wheel at a defined inward end towards a direction away from the wheel at a defined outward end, forming an angle of 7 degrees between the inward end and the outward end.

9. The electric nail gun as claimed in claim 1, wherein the cam has a retracted surface and a raised surface that are not the same surface; when the cam, the magnetic attraction end and the protruding end are within the groove, the retracted surface of the cam contacts the bottom of the groove; and when the protruding end of the cam partially extends outside the groove, the raised surface of the cam contacts the bottom of the groove.

10. An operating method of an electric nail gun, comprising following steps:

a step of turning on a power switch by first activating the power switch located at a buttstock of a main body;

a step of turning on a motor switch by grasping a holding area of the main body and simultaneously activating the motor switch located at the holding area, causing a motor to drive a wheel and maintain continuous rotation;

a step of turning on a safety switch by moving the electric nail gun to a target object, followed by making a safety slider to be against the target object and to simultaneously slide on the head assembly, thereby triggering the safety switch; and a step of turning on a trigger switch by activating the trigger switch at a trigger area of a handle section to generate magnetic force from an electromagnet so as to attract a cam for pivot motion and cause a protruding end of the cam to partially protrude outward from a groove of a pulley and then to be pushed by a driving block of the wheel, which enables the wheel to initiate rotation of the pulley from an initial state and the pulley synchronously to drive a belt through engagement therebetween, allowing movement of a striking nail mechanism from an initial position to a nailing position.

* * * * *